United States Patent [19]

Kunze

[11] Patent Number: 4,825,322
[45] Date of Patent: Apr. 25, 1989

[54] MAGNETIC-TAPE-CASSETTE APPARATUS WITH TWO-BUTTON CONTROL OF THREE FUNCTIONS

[75] Inventor: Norbert Kunze, Ehringshausen, Fed. Rep. of Germany

[73] Assignee: U.S. Philips Corporation, New York, N.Y.

[21] Appl. No.: 211,069

[22] Filed: Jun. 20, 1988

Related U.S. Application Data

[63] Continuation of Ser. No. 862,843, May 13, 1986, abandoned.

[30] Foreign Application Priority Data

May 23, 1985 [DE] Fed. Rep. of Germany ....... 3518534

[51] Int. Cl.⁴ .................. G11B 5/008; G11B 15/00; G11B 17/00
[52] U.S. Cl. ............................ 360/96.3; 360/93; 360/90; 242/199
[58] Field of Search ............ 360/93, 90, 96.1, 96.6, 360/96.5, 105, 88; 242/197, 198, 199

[56] References Cited

U.S. PATENT DOCUMENTS

| 4,374,401 | 2/1983 | Takai ........................... 360/96.5 X |
| 4,503,476 | 3/1985 | Kommoss et al. ................. 360/90 |
| 4,538,753 | 9/1985 | Hayashi et al. ................. 360/96.3 |
| 4,581,666 | 4/1986 | Itoh .......................... 360/96.4 X |
| 4,587,584 | 5/1986 | Tatino ........................ 360/96.1 |
| 4,599,665 | 7/1986 | Yoshida ....................... 360/96.3 |
| 4,623,945 | 11/1986 | Deutsch et al. ................ 360/93 |
| 4,623,946 | 11/1986 | Ida ........................... 360/96.3 X |
| 4,628,381 | 12/1986 | Takai ......................... 360/96.5 |
| 4,639,800 | 1/1987 | Tanaka et al. ................. 360/96.2 |
| 4,672,484 | 1/1987 | Teragachi et al. .............. 360/90 |

FOREIGN PATENT DOCUMENTS

| 3312136 | 6/1981 | Fed. Rep. of Germany ........ 360/93 |
| 2034098 | 5/1980 | United Kingdom .............. 360/96.5 |

*Primary Examiner*—Stuart N. Hecker
*Assistant Examiner*—Alfonso Garcia
*Attorney, Agent, or Firm*—David R. Treacy

[57] ABSTRACT

A function, such as ejection of a cassette from a magnetic-tape-cassette apparatus, is performed by depressing two pushbuttons simultaneously, where each of said pushbuttons moves an associated button rod when depressed singly to perform an individual apparatus function, such as fast winding. A third rod such as an ejection rod is moved when the two buttons are depressed simultaneously, via a control member arranged on the third rod by a support. The control member is engaged by a respective guide surface to be displaced laterally when one of the buttons is depressed, and remains in a central position when both buttons are simultaneously depressed, to move the third rod in the direction of button movement. When only one button is depressed, during return movement of the button to the initial position a spring biases the control member to its central position, so that the entire mechanism occupies minimal space and is easily redesigned into a three button actuating mechanism.

21 Claims, 4 Drawing Sheets

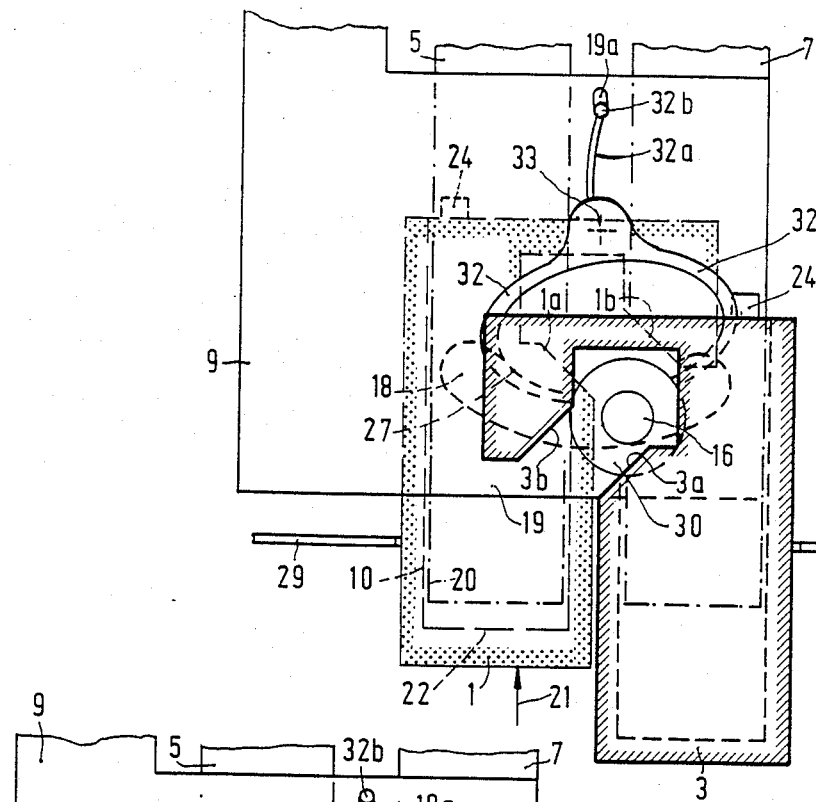
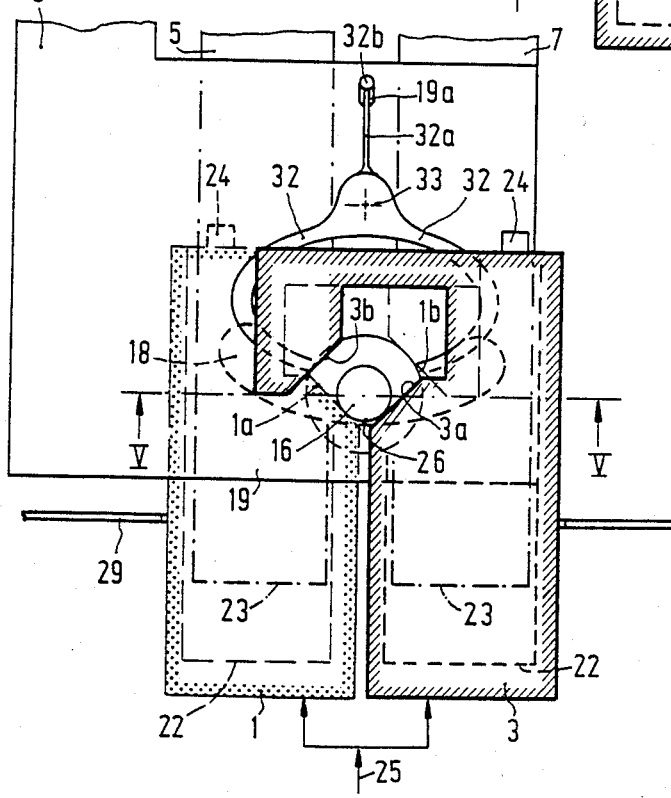
FIG. 2
FIG. 3

4,825,322

MAGNETIC-TAPE-CASSETTE APPARATUS WITH TWO-BUTTON CONTROL OF THREE FUNCTIONS

This is a continuation of application Ser. No. 862,843, filed May 13, 1986, now abandoned.

BACKGROUND OF THE INVENTION

The invention relates to an apparatus, such as a magnetic-tape-cassette apparatus, comprising two push-buttons and associated push-button rods which, when pushed inwards from their initial positions separately over the length of an inward travel, cause parts of the apparatus to perform separate functions; and when depressed simultaneously cause a third function to be performed. More particularly, the invention relates to such apparatus comprising a third rod which, when it is actuated causes a part of the apparatus to perform the third function. The third rod is connected via a support to a control member which can be moved sideways out of a central position relative to the direction of movement of the push-button rods, a sideways movement of the control member enabling the associated push-button rod to be actuated by guide surfaces when only one push-button is depressed. When both push-buttons are depressed simultaneously the guide surfaces of the control member block said sideways movement in such a way that the third rod is actuated.

Such a magnetic-tape apparatus is disclosed in GB-A-No. 2,034,098. This magnetic-tape apparatus comprises two such button rods which are actuated by means of push-buttons, one of these rods, when actuated separately, serving to set the apparatus to, for example, fast forward winding. If the other push-button is depressed separately the apparatus is set to fast reverse winding. If both rods are actuated simultaneously this causes a cassette present in the cassette holder of the apparatus to be ejected by the third rod. In order to enable this additional function of the push-buttons and push-button rods to be realised the push-button rods are formed with guide surfaces which cooperate with a control member.

The third actuating rod is a bell-crank lever which activates an electrical switch controlling the ejection function through an electromagnet. This construction cannot be used in conjunction with an actuating rod such as an ejection rod in a car cassette-player, because such ejection rods are movable parallel to the direction of movement of the push-button rods.

Such an ejection rod is known, for example from DE-A-No. 33 12 136, to which U.S. Pat. No. 4,623,945 corresponds. However, this ejection rod is activated by means of a third push-button, which occupies space on the front panel of the apparatus.

SUMMARY OF THE INVENTION

It is the object of the invention to construct an apparatus having three separate functions controlled by means of two push-buttons in such a way that the parts of a three-push-button apparatus can be actuated simply by means of two buttons, the third function being performed smoothly when the two buttons are depressed simultaneously.

A further object is to enable a simple adaptation of a three-button apparatus to perform three functions with two buttons, in which both buttons and associated actuating rods move in the same direction.

According to the invention, during the return movement of the one and/or the other push-button rod the support and the control member are urged to their central positions relative to the push-button rods by a positioning device, the direction of movement of the third rod corresponding to that of the push-button rods and the push-buttons.

In this way only a slight modification and adaptation of the third rod of a three-push-button apparatus is necessary. Thus, a two-push-button apparatus can be derived from a three-push-button apparatus using a small number of simple elements. Since the control member moves back to its central position relative to the push-button rods, the third function is started rapidly and smoothly with minimal friction when the push-buttons are depressed simultaneously.

Preferably the support and the control member are urged to their central positions by at least one spring arm. Such a spring arm can be manufactured easily from a plastic material and can be injection-molded integrally with the other parts on the third rod. The support, control member and spring arm are thus part of a one-piece unitary body.

In a further embodiment of the invention the control member is arranged in a guide opening in the third actuating rod. The opening is bounded by walls which limit the pivotal movement of the control member in a lateral direction. The walls of the guide opening thus limit the lateral movement of the control member, and enable the control member to be returned more rapidly to its center position.

In yet another embodiment of the invention the guide surfaces are formed on the corresponding push-buttons. Providing the guide surfaces in the push-buttons considerably facilitates the adaptation of the three-push-button construction to two push-button operation. Moreover, this construction can be made compact because no additional space is required inside the apparatus.

In a preferred embodiment of the invention the third rod is an ejection rod. The ejection rod extends adjacent the push-button rods and has an extension which is formed with the guide opening and which extends transversely of the direction of movement of the rods. Such a construction requires a minimal space and is easy to derive from a three-button actuating mechanism.

Embodiments of the invention will be described in more detail, by way of example, with reference to the accompanying drawings.

BRIEF DESCRIPTION OF THE DRAWING

FIG. 2 is a plan view illustrating the operation for a first function, such as fast reverse winding, which corresponds to the operation for a second function, such as fast forward winding, when the push-buttons and push-button rods are set to the opposite positions, FIG. 3 shows the positions of the push-buttons, the push-button rods and the third rod relative to one another at the beginning of a third function such as an ejection process.

DESCRIPTION OF THE PREFERRED EMBODIMENTS

Figure 1:
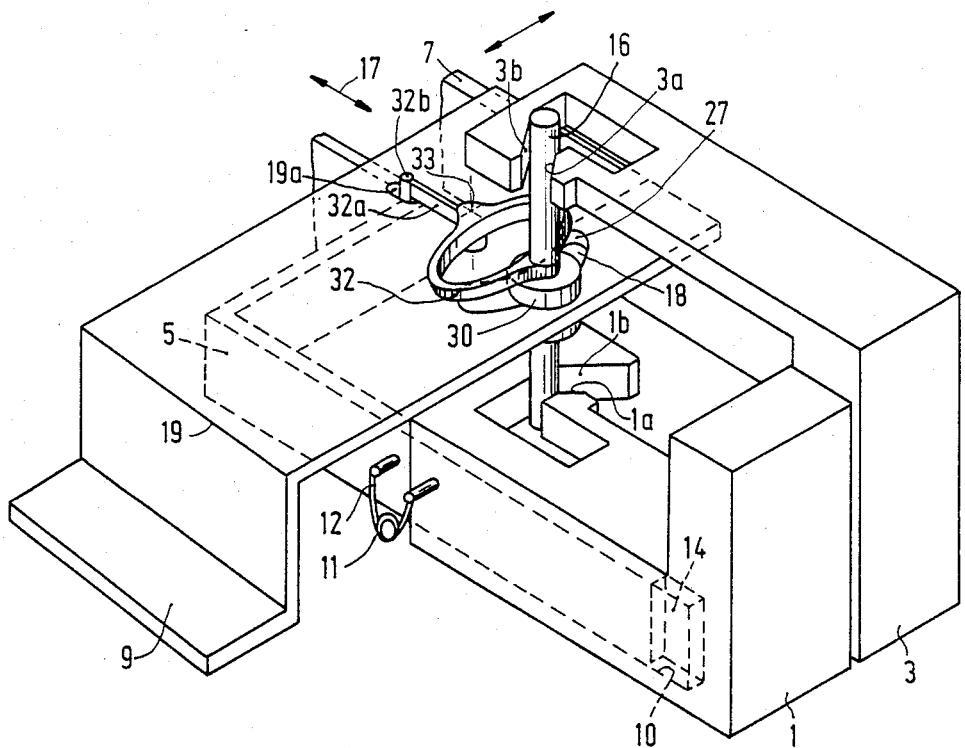
FIG. 1 is a schematic view of a mechanism for performing three actuating functions by means of only two push-buttons.

FIG. 1 shows push-buttons 1, 3, push-button rods 5, 7 and an ejection rod 9 for ejecting cassettes from a cassette holder of a magnetic-tape apparatus, not shown. The push-buttons 1, 3 are axially movable on the push-button rods 5, 7 with the aid of guides 10. In the non-loaded condition pressure springs 11, shown schematically, whose ends 12 act on the push-button rods 5, 7 and on the push-buttons 1, 3 urge the push-buttons forwards into their initial positions away from the push-button so that they are freely movable over a path 14. If the travel of the push-button rods is longer than the travel of the ejection rod 9, the push-buttons need not be movable relative to the push-button rods.

In this embodiment the push-buttons 1, 3 are formed with guide surfaces 1a, 1b and 3a, 3b. The guide surfaces 1a and 3a guide a control member formed by a control pin 16 during the forward movement and the guide surfaces 1b and 3b guide this pin during the return movement. The guide surfaces in the individual push-buttons extend parallel to each other and are inclined relative to the direction of movement indicated by a double arrow 17. The respective guide surfaces 1a, 1b and 3a, 3b are spaced from each other in such a way that the control pin 16 is readily movable between these guide surfaces. The guide surfaces 1b, 3b act as a positioning device for the control pin 16, pushing the pin 16 into its central position during the return movement of the push-button rod 5 or 7.

Figure 5:
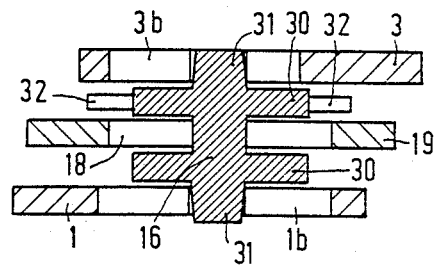
FIG. 5 illustrates the construction of the control member in a sectional view taken on the line V—V in FIG. 3.
Figure 6:
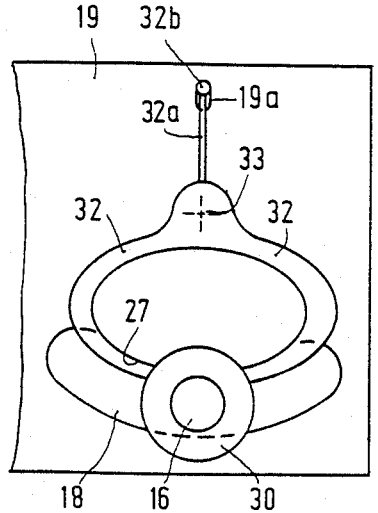
FIG. 6 is a plan view of the support and the guide of the control member.

Between the guide faces 1a, 1b and 3a, 3b the control pin 16 extends through an arcuate guide slot or opening 18 in which it is guided in such a way that it is easily movable in both directions but cannot fall out of this guide slot or opening 18. FIGS. 5 and 6 show this construction in more detail. The control pin 16 is guided in the guide slot or opening 18 under spring load. As shown in FIG. 6 this is achieved in that the pin 16 is connected via a guide disc 30 to resilient arms 32. The arms 32 are connected to a pivot 33, which is further connected to a resilient arm 32a which carries at its free end a pin 32b. The pin 32b is guided by a slot 19a in an extension 19 of the ejection rod 9, the longitudinal direction of the slot extending parallel to the arrow 17. Thus, the pin 16 is pivotally mounted in the pivot 33 via a support in the form of the resilient plastic arms 32. As shown in FIG. 2, the resilient arm 32a also acts as a positioning device, because during each sideways movement of the pin 16 the arm 32a is bent, and the spring loading force of the arm 32a improves the positioning function of the guide surfaces 1b,3b. Such a construction ensures a smooth movement of the push-buttons. The guide slot or opening 18 is formed in the extension 19 of the ejection rod 9 which, like the push-button rods 5, 7, is movable in the direction indicated by the double arrow 17. The functions of the apparatus, not shown, which are controlled by means of the push-buttons may be as follows, for example: separate actuation of the push-button rod 5 results in "fast reverse winding" (FRW), separate actuation of the push-button rod 7 gives "fast forward winding" (FFW), simultaneous partial actuation of both push-button rods gives "reversal" in the case of an auto-reverse deck (or "stand-by" in the case of a non-auto-reverse deck) and simultaneous full actuation of both push-button rods 5, 7 with simultaneous actuation of the ejection rod 9 results in ejection of the cassette.

FIGS. 2 and 3 show the push-buttons, 1, 3, the push-button rods 5, 7 and the ejection rod 9 in plan view. In these figures some of the parts partly overlap one another. The push-button rods 5, 7 are shown in dash-dot lines 20 at the location where they extend within the push-buttons 1, 3. The guides 10 are shown in dashed lines.

FIG. 2 shows a push-button position when the button 1 has just been depressed in the direction indicated by the arrow 21. The bottom 22 of the guide 10 has not yet reached the front edge 23 of the push-button rod 5. The button 1, however, has already been depressed so far that its guide surface 1a has pressed the pin 16 aside to the right in the guide slot or opening 18 towards the adjacent push-button 3. When the button 1 is pressed further inwards it moves past the pin 16, thereby actuating the push-button rod 5 to start the functions for fast-reverse winding inside the apparatus.

The same cycle of operations is performed if instead of the button 1 the button 3 is depressed. The guide surface 3a then presses the pin 16 to the left in the guide slot or opening 18 towards the push-button 1. Pressing the push-button 3 sets the apparatus to fast forward winding.

The push-buttons have hooks 24 which can engage behind a wall (not shown) of the extension 19. This ensures that the push-buttons 1 and 3 cannot be urged outwards beyond their initial or rest positions, as can be seen in FIG. 2 where the push-button 3 is in its initial position.

For the sake of clarity the push-buttons 1 and 3 with their associated parts are marked differently. The push-button 1 and its associated parts are marked with dotted contours and the push-button 3 with its associated parts with diagonally hatched contours.

If the push-button 5 is depressed in order to obtain fast reverse winding, this button is latched in the depressed position, in a manner not shown, inside the apparatus. Unlatching is possible by depressing the other push-button. The button 5 then springs back and thereby also resets the push-button 1. If the push-button rod 5 is already in its fully returned position, the pressure spring 11 urges the push-button 1 further outwards into the initial or rest position. During this movement the guide surface 1b of the push-button 1 abuts against the control pin 16, thereby pressing it into its central position, as can be seen in FIG. 1. This movement is aided by the resilient arms 32 springing back.

FIG. 3 shows how the ejection rod 9 is also actuated when the two push-button-rods 5 and 7 are pressed inwards simultaneously. Pressure is exerted on the push-buttons 1 and 3 in the direction indicated by an arrow 25. Under the influence of its support 32 the pin 16 now engages a V-shaped recess 26 formed by the guide surfaces 1a and 3a. As a result of the depression of the push-buttons 1 and 3 the pin 16 remains in the recess 26 and via a wall 27 of the guide slot 18 the pin engages the extension 19 and presses the ejection rod 9 inwards. As soon as the bottoms 22 of the recesses in the push-buttons 1 and 3 abut against the front edges 23 of the push-button rods 5 and 7, the push-button rods 5 and 7 are also actuated.

Figure 4:
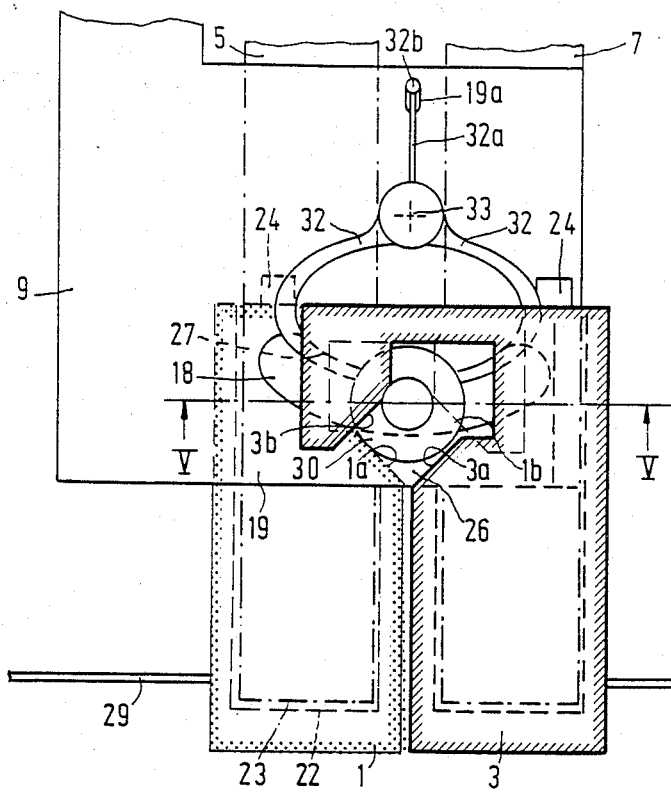
FIG. 4 shows the positions of the push-button rods, the push-buttons and the third or ejection rod relative to each other when ejection has been completed.

FIG. 4 shows the push-button rods and the ejection rod in the ejection position, in which the ejection rod has ejected the cassette from the cassette holder. The hooks 24 of the push-buttons 1 and 3 have abutted against a wall (not shown) of the extension 19 and thereby retain the push-buttons 1 and 3 and hence the push-button rods 5 and 7 in their inward positions. In the ejection position the ejection rod 9 slightly recedes into the apparatus, so that the control pin 16 is lifted out of the recess 26.

A comparison of FIGS. 2, 3 and 4 shows that the push-buttons 1 and 3 do not project equally far from a front wall 29 of the apparatus in the different operating positions. In FIG. 2 the ejection rod is in the outward position, which means that a cassette has been inserted.

In FIG. 3 the ejection rod 9 is just moved inwards; in FIG. 4 it is in the fully inward position and the buttons 1 and 3 are also in their fully inward positions; that is, their ejection positions. In this position the cassette has been ejected from the cassette holder. If subsequently a cassette is inserted again, the three rods, 5, 7 and 9 move forwards, the control pin being retained in the central position (the same relative position of the control pin, the ejection rod and the push-buttons as shown in FIG. 4).

FIG. 5 shows the construction of the control pin 16 in a sectional view taken on the lines V—V in FIG. 3. Above and below the extension 19 the control pin 16 is provided with guide discs 30. The pin 16 is molded as an integral unit with the discs 30, the arms 32, the spring arm 32a, the pin 32b and the pivot 33, and are thus a one-piece unitary body. In this way the control pin 16 is supported by the extension 19. Portions 31 of the control pin project into the push-buttons 1 and 3.

Figures 7, 8:
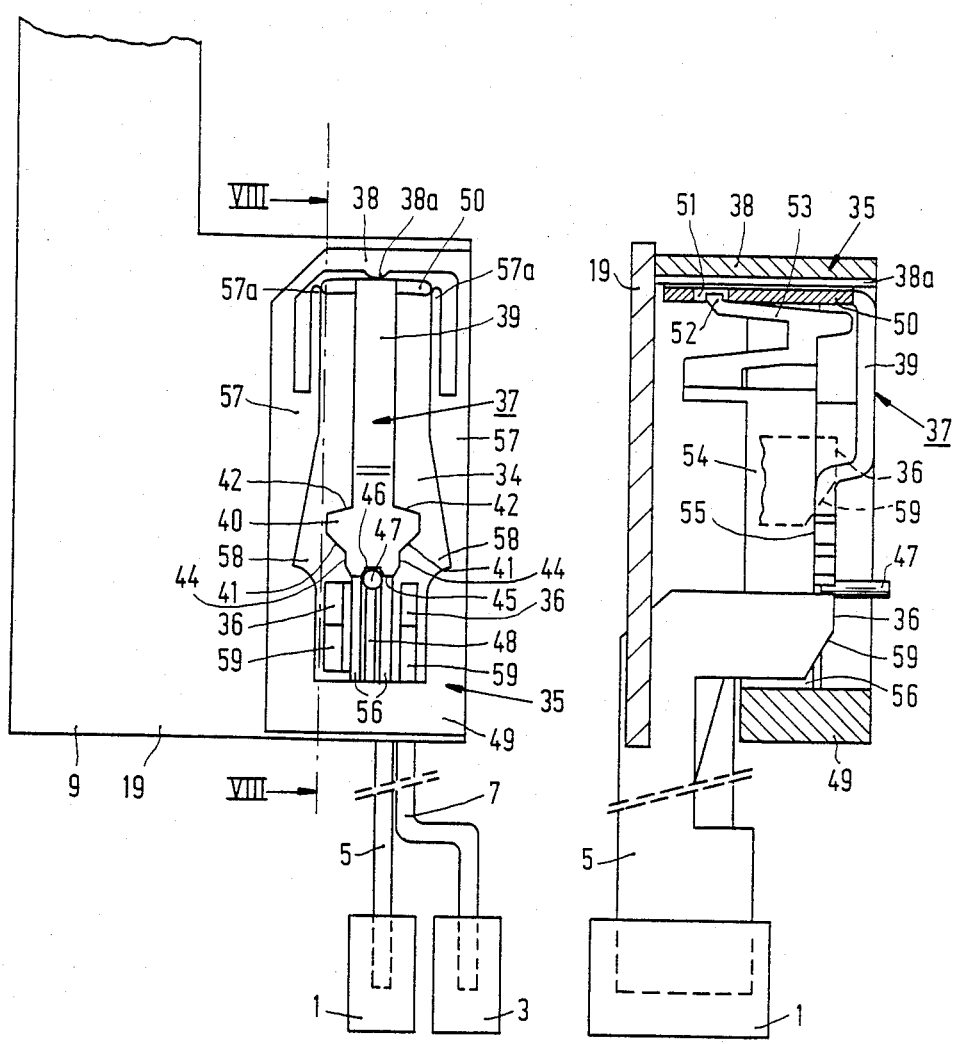
FIG. 7 is a plan view illustrating the cooperation between the third actuating rod and the two push-button rods in a second, modified embodiment.
FIG. 8 is a sectional view taken on the line VIII—VIII in FIG. 7 and showing a box-shaped extension of the third rod and parts situated inside this box-shaped extension.

FIG. 7 illustrates another method of coupling the third rod 9 to the push-button rods 5 and 7 when the push buttons 1 and 3 are depressed simultaneously. In this second embodiment the extension 19 of the third rod 9 is provided with rectangular box 35 which together with other molded parts is integral with the third rod 9. Nose-shaped projections 36 of the push-button rods 5 and 7 are guided so as to be movable inside the interior 34 of the box 35. Inside the interior 34 an arm 39 of an L-shaped support 37 extends in the longitudinal direction of the push-button rods 5 and 7, another arm 50 of the support 37 extending perpendicular to the push-button rods and engaging against a knife-edge bearing 38a, situated on the rear wall 38 of the box 35. This rear wall 38 is situated on that side of the box 35 which is remote from the push-buttons 1 and 3. The free end of the arm 39 of the L-shaped support 37, which extends in the longitudinal direction of the push-button rods 5 and 7, carries a head portion 40. This head portion 40 has front guide faces 41 and rear guide faces 42. The front guide faces 41 diverge and the rear guide faces 42 converge in the direction of inward movement of the push-button rods 5 and 6. Between these guide faces the head portion 40 is formed. Sides 44 extend towards a front side 45 in the direction of movement and adjoin the front guide faces 41. A shallow slot 46 is formed in the head portion 40 and extends in the direction of movement starting from the side 45. The head 47 of a spring arm 48, which is molded onto the front wall 49 of the box 35, engage in this slot 46.

FIG. 8 shows the construction of FIG. 7 in a longitudinal sectional view of the box 35, so that the support 37 is shown partly in side view. In FIG. 8 it can be seen that the arm 39 of the means 37 extends in a substantially horizontal direction while the arm 50, which engages against the knife-edge bearing 38a, extends in a vertical direction. In the arm 50 an opening 51 is formed in which a nose 52 of a spring arm 53 engages. The spring arm 53 is connected to a plastic part 54, whose upper side 55 supports the arm 39. By means of two plastic strips 56 the plastic part 54 is connected to the front wall 49 of the box 35. The plastic part 54 and the strips 56 togther with the outer walls of the box 35 constitute guides for the projections 36 of the push-button rods 5 and 7.

At the location of the head portion 40 recesses 58 are formed in the longitudinal walls 57 of the box 35, in which recesses the head portion 40 is engageable. The recesses 58 also form stops to limit the deflection of the arm 39.

The walls 57 are connected to spring arms 57a which extend parallel to the walls 57. The arms 57a have free ends which press resiliently against the arm 50. Together with these arms 57a the spring arm 48 constitutes a positioning device, urging the support 37 into its central position (FIG. 7). If in the embodiment shown in FIGS. 7 and 8 one of the push-buttons, for example the push-button 1, is depressed, the projection 36 of the push-button rod 5 abuts against the front guide face 41 of the arm 39 and presses the arm to the right. This enables the push-button 1 to be pressed further inwards. When the push-button rod 5 moves outwards again its projection 36 presses the arm 39 again to the right by riding along the rear guide face 42, enabling the push-button rod to move fully outwards. After it has been pressed sideways the arm 39 is always returned to its center position by the spring arms 48 and 57a. The same functions of the apparatus are obtained if the other push-button 3 presses the rod 7 inwards and this rod moves back again.

When the two push-buttons 1 and 3 are deprsssed simultaneously, the two projections 36 move against the two front guide faces 41. This prevents a lateral movement of the arm 39. Since the arm 39 is always in its center position, engagement with the front guide faces 41 proceeds rapidly. When the push-buttons 1 and 3 are pressed further inwards, the projections 36 press the rod 9 further backwards by movement of the arm 39 and the rear wall 38 of the box 35 in order to obtain the third function. When the push-buttons 1 and 3 are released the push-button rods 5 and 7 move outwards again.

It may happen that the second push-button rod is also pressed inwards when a push-button rod has moved inwards and its projection 36 is situated behind the head-portion 40. Its projection 36 can also press the head portion 40 aside again so that both projections 36 then lie behind the head portion. In order to avoid jamming when the push-button rods return, the projections are formed with bevelled edges 59. These bevelled edges 59 abut against the rear guide faces 42 and press the arm 39 upwards. This upward movement is possible because the resilient arm 53 again presses the arm 50 against the knife-edge bearing 38a. Thus, the arm 39 is again pressed onto the side 55 of the plastic part 54.

In order to facilitate mounting of the L-shaped support 37, the projection 52 on the resilient arm 53 engages in the opening 51 and has such a shape that the arm 50, as it is pressed into the box 35, pushes away the spring arm 53, causing the nose-shaped projection 52 to snap into the opening 51.

What is claimed is:

1. An apparatus comprising:
   two button rods arranged for movement in the apparatus in a first direction to cause an apparatus part to perform a respective function, and for movement in a second direction,
   two buttons, each connected to a respective rod for manual movement from an initial position for moving the rod in said first direction over a length of given travel,
   a third rod, and
   means responsive to simultaneous movement of said two buttons in said first direction for actuating said third rod to cause the apparatus to perform a further function, said means including a plurality of guide surfaces, a support, and a control member; said control member being connected via said support to said third rod, and being movable by one of said guide surfaces from a central position in a lateral direction transverse said first and second directions to enable a movement of one of said first and second rods in said first direction without actuation of said third rod; and responsive to simultaneous movement of said two buttons, said guide surfaces blocking control member movement in said lateral direction, for actuating said third rod,
   characterized by comprising positioning means including two further guide surfaces for urging said support and said control member to their central positions during movement of at least one of said two buttons in said second direction to the respective initial position, each of said further guide surfaces being fixed in position relative to a respective one of said plurality of guide surfaces, and
   also characterized in that said third rod is directly moved in directions of movement parallel to said first and second directions.

2. An apparatus as claimed in claim 1, characterized in that said positioning means comprises at least one spring arm urging said support and control member to their respective central positions.

3. An apparatus as claimed in claim 2, characterized in that said support is arranged on said third rod, and said control member is disposed between said support and said two buttons.

4. An apparatus as claimed in claim 3, characterized in that said support, said control member and said spring arm are formed as a one-piece unitary member.

5. An apparatus as claimed in claim 4, characterized in that said third rod has a guide opening formed therein, and said spring arm positions said control member for pivotal movement in said lateral direction within said guide opening, said walls of said opening limiting said pivotal movement.

6. An apparatus as claimed in claim 5, characterized in that said guide opening has an arcuate shape.

7. An apparatus as claimed in claim 2, characterized in that said guide surfaces are formed respectively on corresponding ones of said two pushbuttons,
   the apparatus comprises means for mounting each of said two buttons at a front end of a respective button rod for axial movement with respect to the respective rod in said first and second directions, and
   a respective spring associated with each of said two buttons for spacing the button from the respective button rod so as to provide a path of free movement for each respective button.

8. An apparatus as claimed in claim 7, characterized in that said first direction is an inward movement direction, and
   each of said two buttons comprises a respective stop arranged to engage an edge of the third rod for limiting outward movement of the respective button relative to the respective button rod.

9. An apparatus as claimed in claimed 1, characterized in that said guide surfaces are formed respectively on corresponding ones of said two pushbuttons,
   the apparatus comprises means for mounting each of said two buttons at a front end of a respective button rod for axial movement with respect to the respective rod in said first and second directions, and
   a respective spring associated with each of said two buttons for spacing the button from the respective button rod so as to provide a path of free movement for each respective button.

10. An apparatus as claimed in claim 9, characterized in that said first direction is an inward movement direction, and
    each of said two buttons comprises a respective stop arranged to engage an edge of the third rod for limiting outward movement of the respective button relative to the respective button rod.

11. An apparatus as claimed in claim 2, characterized in that said third rod has a guide opening formed therein, and said spring arm positions said control member for pivotal movement in said lateral direction within said guide opening, said walls of said opening limiting said pivotal movement.

12. An apparatus as claimed in claim 11, characterized in that said guide opening has an arcuate shape.

13. A magnetic-tape-cassette apparatus comprising:
    two button rods arranged for movement in the apparatus in a first direction to cause an apparatus part to perform a respective function, and for movement in a second direction,
    two buttons, each connected to a respective rod for manual movement from an initial position for moving said respective rod in said first direction over a length of given travel,
    an ejection rod for ejecting a cassette which has been inserted into the apparatus, and
    means responsive to simultaneous movement of said two buttons in said first direction for actuating said ejection rod to cause the apparatus to eject the cassette inserted into the apparatus, said means including a plurality of guide surfaces, a support, and a control member; said control member being connected via said support to said ejection rod, and being movable by one of said guide surfaces from a member central position in a lateral direction transverse said first and second directions to enable a movement of one of said first and second rods in said first direction without actuation of said ejection rod; and responsive to simultaneous movement of said two buttons, said guide surfaces blocking control member movement in said lateral direction, for actuating said ejection rod,
    characterized in that said support is movable from a support central position,
    the apparatus further comprising positioning means including two further guide surfaces for urging said support and said control member to their respective central positions during movement of at least one of said two buttons in said second direction to the respective initial position, each of said further guide surfaces being fixed in position relative to a respective one of said plurality of guide surfaces and said ejection rod is directly moved in directions of movement parallel to said first and second directions.

14. An apparatus as claimed in claim 13, characterized in that said positioning means comprises at least one spring arm urging said support and control member to their respective central positions.

15. An apparatus as claimed in claim 14, characterized in that said support is arranged on said ejection rod, and said control member is disposed between said support and said two buttons.

16. An apparatus as claimed in claim 15, characterized in that said support, said control member and said spring arm are formed as a one-piece unitary member.

17. An apparatus as claimed in claim 16, characterized in that said ejection rod has a guide opening formed therein, and said spring arm positions said control member for pivotal movement in said lateral direction within said guide opening, said walls of said opening limiting said pivotal movement.

18. An apparatus as claimed in claim 17, characterized in that said ejection rod comprises an extension adjacent said button rods, said guide opening being formed in said extension and extending transversely the first and second directions of movement.

19. An apparatus as claimed in claim 18, characterized in that said guide surfaces are formed respectively on corresponding ones of said two pushbuttons,
  the apparatus comprises means for mounting each of said two buttons at a front end of a respective button rod for axial movement with respect to the respective rod in said first and second directions, and
  a respective spring associated with each of said two buttons for spacing the button from the respective button rod so as to provide a path of free movement for each reepective button.

20. An apparatus as claimed in claim 19, characterized in that said first direction is an inward movement direction, and
  each of said two buttons comprises a respective stop arranged to engage an edge of the third rod for limiting outward movement of the respective button relative to the respective button rod.

21. An apparatus comprising:
  two button rods arranged for movement in the apparatus in a first direction to cause an apparatus part to perform a respective function, and for movement in a second direction,
  two buttons, each connected to a respective rod for manual movement from an initial position for moving the rod in said first direction over a length of given travel,
  a third rod, and
  means responsive to simultaneous movement of said two buttons in said first direction for actuating said third rod to cause the apparatus to perform a further function, said means including two guide surfaces and a control member; said control member being connected to said third rod, and being movable by one of said guide surfaces from a central position in a lateral direction transverse said first and second directions to enable a movement of one of said first and second rods in said first direction without actuation of said third rod; and responsive to simultaneous movement of said two buttons, said guide surfaces blocking control member movement in said lateral direction, for actuating said third rod,
  characterized by comprising two further guide surfaces for urging said control member to its central position during movement of at least one of said two buttons in said second direction to the respective initial position, each of said further guide surfaces being spaced in a direction parallel to said first direction from, and fixed in position relative to, a respective one of said plurality of guide surfaces, and
  also characterized in that for actuation said third rod is directly moved in directions of movement parallel to said first and second directions.

* * * * *